United States Patent [19]

Schmitter

[11] Patent Number: 5,583,983

[45] Date of Patent: Dec. 10, 1996

[54] MULTI-PLATFORM OBJECT-ORIENTED SOFTWARE DEVELOPMENT AND DEPLOYMENT SYSTEM

[75] Inventor: Robert L. Schmitter, Philadelphia, Pa.

[73] Assignee: Objectware, Inc., King of Prussia, Pa.

[21] Appl. No.: 340,835

[22] Filed: Nov. 17, 1994

[51] Int. Cl.$^6$ .............................. G06F 15/00; G06F 9/00; G06F 9/445

[52] U.S. Cl. .......................... 395/705; 395/967; 395/348

[58] Field of Search ................................ 395/155, 161, 395/700, 650

[56] References Cited

U.S. PATENT DOCUMENTS

| | | | |
|---|---|---|---|
| 5,121,478 | 6/1992 | Rao | 395/157 |
| 5,295,222 | 3/1994 | Wadhwa et al. | 395/700 |
| 5,325,534 | 6/1994 | Galy et al. | 395/700 |
| 5,327,529 | 7/1994 | Fults | 395/155 |

OTHER PUBLICATIONS

Shilling, John J. "How to roll your own persistent objects in C++". Journal of Object–Oriented Programming. Jul.–Aug. 1994. pp. 25–32.

Reviewer: William Ellis Oglesby. "zApp: A multiplatform GUI". Journal of Object–Oriented Programming. Jun. 1994. pp. 66–68.

*Primary Examiner*—Raymond J. Bayerl
*Assistant Examiner*—Huynh Ba
*Attorney, Agent, or Firm*—Dann, Dorfman, Herrell and Skillman, P.C.

[57] ABSTRACT

A system for providing cross-platform portability of object-oriented structures employs a set of canonical definitions of objects to produce an archive of an object-oriented structure in a standard format. The archive may be provided within object-oriented environments utilizing different operating systems to reproduce the archived structure using native objects specific to the respective operating systems. An archiver is provided for producing portable archives of native object-oriented structures. A de-archiver is provided for constructing native object-oriented structures within an object-oriented environment as specified in a portable archive. The archiver and the de-archiver are adapted to store and to retrieve custom, or operating system-specific, information within canonical object references in the portable archive.

35 Claims, 4 Drawing Sheets

MULTI-PLATFORM OBJECT-ORIENTED SOFTWARE DEVELOPMENT AND DEPLOYMENT SYSTEM

BACKGROUND

The commercial success of a software application can rely upon the ability to provide the application in several versions that are each suitable for a different operating system, e.g. "MICROSOFT WINDOWS", "UNIX", "MS-DOS", "APPLE MACINTOSH", and so on. For this reason, it is traditionally necessary to develop separate versions of a software application for each operating system from a single problem specification in order to obtain a commercial software product that will be useful to users of different operating systems.

A continuing trend in the field of software engineering is to allow the programmer to design applications at increasing levels of abstraction. The earliest "programs" were entered into a computer by a bit-level mechanism; such as toggle switches, punch cards, or paper tape; and the job of the programmer was to specify the bit-patterns corresponding to the machine-language instructions that would cause execution of the application. Then, as applications became more sophisticated, symbolic assembly languages were developed to enable the programmer to specify a program in terms of mnemonic codes that represented one or more machine-language steps.

The next level of abstraction was the development of high level languages, so that more complicated functions, constituting modules of assembly code, could be expressed in terms of single commands of a high level language. In order to execute a high-level program, the source code is first compiled to produce assembly code, and then the assembly code is translated into the machine code. Even with high-level languages, the desire for more sophisticated applications has surpassed the ability of a single programmer, or team of programmers, to produce the required quantity of code, or even to test and de-bug large-scale applications at the level of abstraction provided by high-level languages.

Concurrent with the growth of high-level languages, certain routine procedures have been delegated to the operating systems of computers. For example, the presentation of information in a graphical user interface (GUI) does not require the application programmer to re-write the GUI routines for each application. Modern operating systems incorporate routines, e.g. for window display operations, that can be accessed by system calls from the application to the operating system. Such routine procedures that are provided by an operating system shall herein be referred to as native features of the operating system.

Object-oriented programming is gaining popularity as a software design technique for the development of complex applications. In the object-oriented paradigm, a library of basic functional units having their own code modules and data structures are linked together in accordance with the specification of a problem. Each of the functional units, or objects, is independently designed to communicate with other objects in a specified manner so that the programmer is merely required to specify abstract functional relationships among the selected objects, and the messages to be communicated among the objects, in order to produce an application. Additionally, general classes can be customized when needed to define a subclass. A subclass of a given class inherits particular characteristics from the classes from which it depends.

The computer system that is used in the creation of an object-oriented structure is herein referred to as a development environment. The development environment includes a library of objects, a set of tools for selecting objects from the library and for specifying functional or semantic inter-relations among the selected objects. The development environment must be compatible with the operating system of the computer within which the development environment is installed. The inherent necessity for an object-oriented development environment to function in the context of a particular operating system has hampered the ability of object-oriented programming to be a general technique for producing applications that are independent of the operating system of the development environment.

Since the development environment is, itself, an application, the objects therein usually rely upon native features of the operating system of the computer system within which the development environment exists. Additionally, object-oriented development environments that have been produced for use with different operating systems have not provided a uniform object library or uniformly convenient development tools for producing object-oriented structures within each environment. Hence, although object-oriented programming techniques have enabled progress in the rapid development of complex structures for use in the context of a single operating system, the problem of providing an object-oriented structure in various forms that are each suitable for different operating systems still requires the separate development of different native versions of the same structure. In the development of structures that require customization of a particular class in order to produce a desired object, the problem is compounded, since one of the important advantages of object-oriented programming (i.e. the ability to re-use customized objects) is then lost when the structure must be re-developed within each desired target operating system.

The need to re-develop object-oriented structures for use in different operating systems reduces the productivity of the software engineer. In order to re-develop the structure for each operating system, the software engineer must, of course, use only the development tools that are available for each operating system. Hence, the software engineer must become familiar with the different development tools for performing the same task within each respective operating system. Additionally, development of an object-oriented structure in one environment may be a relatively simple task, while re-development in another environment may be more time-consuming because not all development environments are equally powerful or easy to use.

SUMMARY OF THE INVENTION

In order to provide a system for the development of object-oriented applications and for cross-platform deployment, or further development, of object-oriented applications, a library of objects, defined using a standard high-level language, is provided in a form that is independent of any single operating system. The standard library of objects is provided to a selected computer system having a first operating system and an object-oriented development environment. Within the object-oriented development environment, the software engineer assembles an application on the basis of a problem specification. When the selected objects have been linked in the desired manner, an archive, or object document, of the application is produced. The object document is provided in a portable form that can then be provided to a second computing system having a different native operating system than the first computing system upon which the object-oriented development environment is installed.

Within the second computing system, the portable object document is then used, in conjunction with the standard library, to re-create the application by selecting objects from the library and linking the selected objects together in the manner specified in the object document.

In a preferred embodiment, the class definitions in the standard library contain alternative system calls for invoking equivalent native features of each of several operating systems. Conditional compilation instructions identifying such alternative system calls are provided within the source code defining such objects, so that the appropriate system call is made by the application whenever a native feature is required by the application. In this manner, the application can employ standard native features of each of several different operating systems when the application is executed, even though the application was developed within the context of a particular operating system.

In accordance with another aspect of the invention, the object document can be utilized within a development environment of the second computer system in order to modify or to further develop the application if desired.

In accordance with another aspect of the invention, a representation of an object-oriented structure is stored within a portable archive. Each of the objects within the structure is entered into the archive in a standard format that is independent of various native object-oriented environments. The structure can then be deployed in any object-oriented environment by translating the standard-format archive references into native object specifications when the structure is deployed in each environment. The translation procedure can be implemented within a de-archiving object that is programmed to translate the archive or has access to a translation table which associates the standard-format object references with native object specifications

BRIEF DESCRIPTION OF THE DRAWING

The present invention, in accordance with the foregoing summary, shall be described in detail herein by way of example in conjunction with the attached drawing in which.

DETAILED DESCRIPTION

Figure 1:
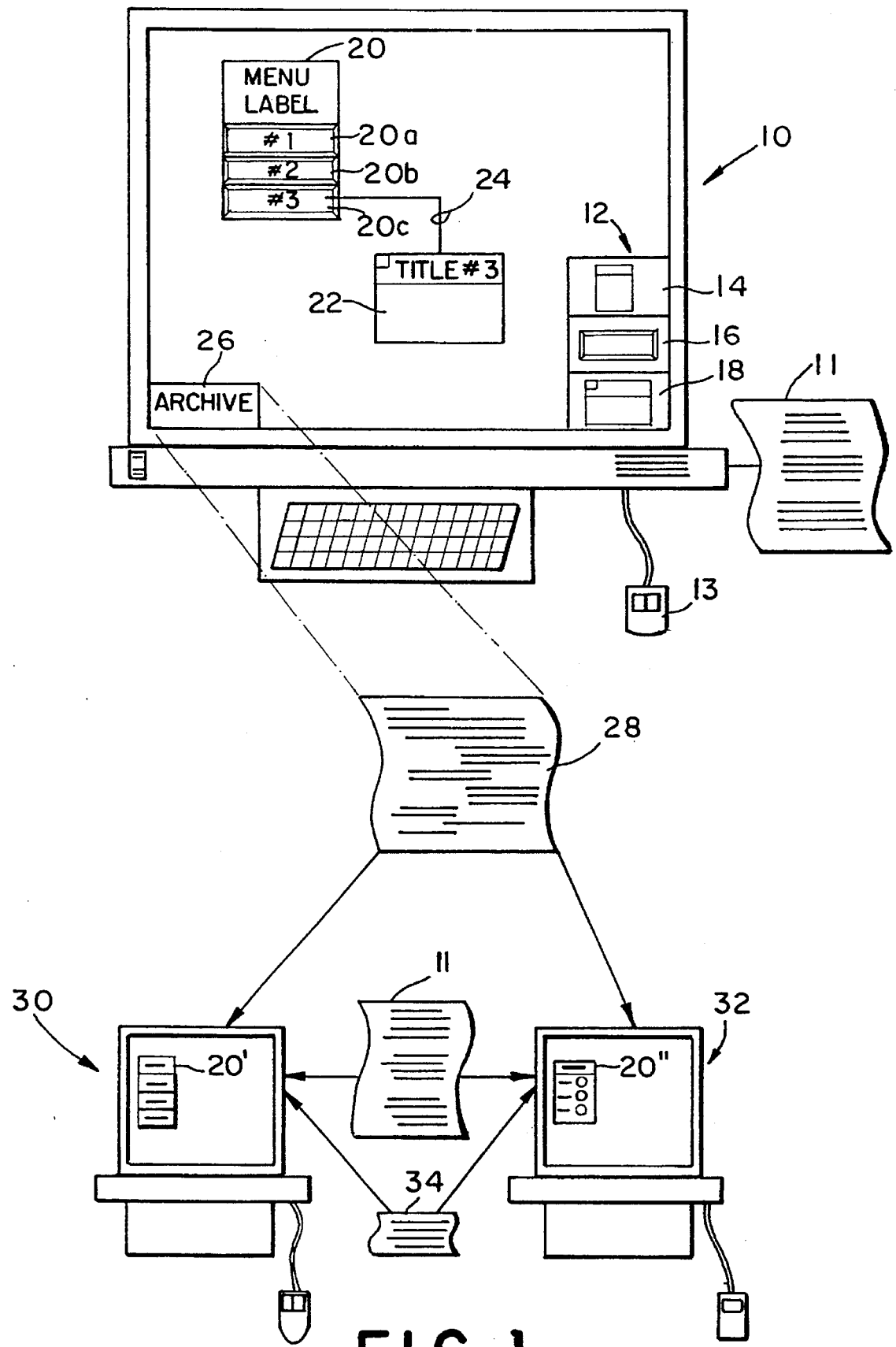
FIG. 1 is a diagram of an embodiment of a cross-platform object-oriented development and deployment system for developing and deploying an object-oriented application.

Referring now to FIG. 1, there is shown a computer system 10 for implementing an object-oriented (OO) development environment. The OO development environment is preferably a graphically-based environment, such as that produced by NeXTSTEP of Redwood City, Calif., for use with an Intel 486 microprocessor-based personal computer. Of course, other OO development environments may be employed in the practice of the invention, and the NeXTSTEP environment is merely referred to herein for illustrative purposes.

The OO development environment provides the user with a selection of objects or classes of objects, that may be employed to produce an object-oriented structure, such as an application. In the preferred embodiment, these classes are made available to the user as iconic representations thereof. For example, the user may be presented with a palette 12, containing a menu icon 14 representing a class of menus, a button icon 16 representing a class of buttons, and a window icon 18 representing a class of windows. In practice, many other classes, relating to general types of program objects, may be provided. In order to define an object for use in an application, the user selects a class and then selects the attributes of the desired object from among a selection of possible attributes available for objects of the selected class. This process is sometimes referred to as "instantiation" or producing an object as an "instance" of a class. Additionally, the user may select or define the type and contents of messages that each of the selected objects shall be capable of sending to other objects and/or receiving from other objects. Then, the user links the objects together by defining which objects are to receive and/or to send messages to the other objects of the structure.

Each of the class icons 14, 16, and 18 represents a module of compiled code having its own data structures, that is stored within the computer system. Prior to developing an OO structure in the development environment, a library 11 of source code is provided to the computer system 10 and is compiled to produce an executable. For example, the library 11 would include modules for defining a menu, a button, and a window, and for providing the functions of a menu, a button, and a window in accordance with selected attributes in response to messages that can be passed to the respective modules by other modules.

By way of example, the user of the development environment of FIG. 1 desires to develop a structure that will present a menu having three buttons. Each button of the menu is to cause a corresponding window to open upon actuation of the button. Further functions of the structure are then to be associated with each window.

In the production of the desired structure, the user first selects the menu icon 14, representing the menu class, from the palette 12. Then, the user produces a menu object 20 by specifying the desired attributes of the menu object 20. Such attributes may include the desired screen location of the menu object 20, the desired size of the menu object 20, a text label identifying the menu object 20, and a list of other objects constituting the contents of the menu. Such a list may itself be an object. For the purposes of description herein, the menu object shall be considered as directly having its content objects as attributes. In the preferred OO development environment, selection of the menu icon 14 from the palette 12 activates the display of one or more selection panels that allow the user to assign the desired attributes to the object being specified.

After the menu object 20 has been defined, the user selects the button icon 16 from the palette 12 in order to instantiate button objects 20a–c and to locate each of the button objects 20a–c within the menu object 20. For each button object 20a–c, the user specifies attributes such as the location of each button, a text label, a message to be sent to another object whenever each button is actuated, and the other object to which the message is to be sent. In the present example, the message to be sent by each button is an instruction to a recipient object to perform a specified function.

After each of the button objects has been defined as an instance of the button class, the user may then define window objects that are to be associated with the buttons. As shown in FIG. 1, the user has selected the window class icon 18 from the palette 12 and has instantiated therefrom a window object 22. The window object 22 is instantiated as an instance of the window class by selecting the window class and by specifying such attributes as the size, location, and title of the window object 22. The user may then select further attributes of the window, such as the contents of the window object 22 by establishing further relationships between the window object 22 and still other objects or structures of objects.

In order to establish links between the button objects and their associated window objects, for example between button object 20c and window object 22, in the preferred OO development environment, the user simply draws a graphical connection 24 therebetween. In alternative embodiments, such links may be designated by including an appropriate entry, such as a message and a recipient object, into a textual definition of each object in order to identify the intended recipient object of each message that can be generated by an object in response to a specified event. In the present example, the user draws a connecting link between the button object 20c and the window object 22. The user may also select an "openWindow" message that is to be sent from the button 20c to the window 22. Thus, during execution of the application, an "openWindow" message is generated by the button 20c upon actuation, and the message is sent to the window object 22. The window object 22 shall receive the message and shall respond by performing the function of a window object, i.e. it shall open in accordance with its attributes (size, location, title, etc.).

During the course of developing an object-oriented structure, the user may desire application-specific objects in order to perform specialized functions that are not available in the standard library. The development environment preferably includes an editor and a compiler so that the user can compose source code for such application-specific objects and then compile them for execution within the development environment. The user may then execute and test the application within the development environment.

When development of an object-oriented structure is complete, the user invokes an archiving tool 26, which constructs and saves an archive of the structure. The archiving tool 26 may be an object that can be invoked from within the development environment. Alternatively, the archiving tool 26 may be a separate application for execution outside of the context of the development environment.

An archive, also referred to in the art as a "persistence graph", is a structured list of objects that constitute an object-oriented structure. The archive comprises a template, or object document, of all of the objects in the structure along with the attributes of each object. Additionally, for an object that is a member of a pre-defined class, the archive includes a reference to the class. For any additional objects encountered during the archiving procedure that are members of the same class, the archive includes a reference to the previously-identified class along with the attributes of the later-encountered object.

For example, a count may be kept of the classes that are encountered during the archiving procedure. As each class is encountered for the first time, an identification of the class and the present value of the count are entered into the archive. Later-encountered instances of the same class are identified within the archive as instance of the nth class, where n is the number of the class.

Production of the archive proceeds by invoking each object of the structure and sending a message to each object instructing the object to transmit its attributes, which are to be placed into an object document 28 containing the portable archive. In this connection, each object is provided in advance with procedures for transmitting its attributes and for retrieving its attributes. For example, a "ball" object may have the attributes of a radius (for example, an integer defining the radius of the ball) and a color (for example, a color object defining the color of the ball). In order to provide the ball object with procedures for archiving and de-archiving, the source code definition of the ball object, in "OBJECTIVE C" for example, would include the procedures "putTo:" and "getFrom:" as follows:

putTo:anArchive
[super putTo:anArchive];
[anArchive putInt:ballRadius];
[anArchive putObject:ballColor];
return self;
getFrom:anArchive
[super getFrom:anArchive];
[anArchive getInt:&ballRadius];
[anArchive getObject:&ballColor];
return self;

If an invoked object is linked to a second object, then the invoked object transmits to the archiver, a pointer which indicates the second object as one of its attributes for storage into the object document. For example, the "putTo:" procedure of the ball object includes a "putObject" step which sends to the archiver, a pointer which indicates the color object, which is one of the attributes of the ball object. When the archiver receives an object pointer as an attribute, then the archiver queries the indicated object in order to obtain a reference to the class identity, or other class information, of the indicated object. The archiver then sends a "putTo:" message to the indicated object so that the indicated object will, in response, transmit its attributes to the archiver for storage. In the present example, the ball object will indicate to the archiver that one of the ball object's attributes is a color object. The archiver will query the color object to obtain a class reference identifying the color object as an instance of the color class. Then, the archiver sends a "putTo:" message to the color object, which will transmit its attributes (e.g. numerical values of red, blue, and green intensities) for placement into the object document. The archiving process continues recursively until all of the objects that are involved in the structure have saved their attributes into the object document. Such an archiving procedure is described in an article by J. Shilling in the Journal of Object-Oriented Programming, Volume 7, number 4, pages 25–32.

Figure 2:
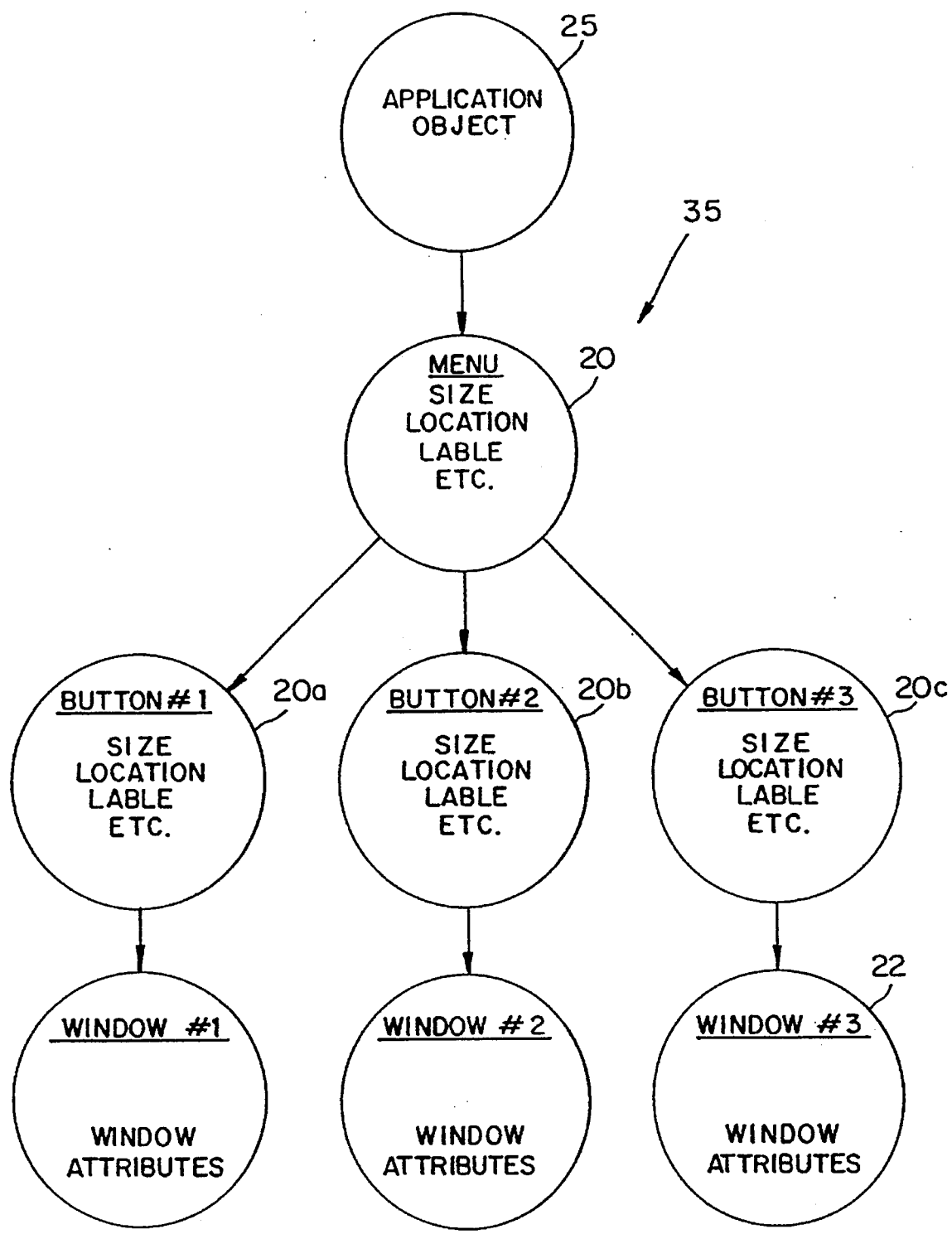
FIG. 2 is a diagram of the inter-relations among the objects of the application of FIG. 1.

The object-oriented structure described hereinabove in connection with FIG. 1 can be shown graphically as the structure 35 shown in FIG. 2. A tabular representation of the structure, such as would be constructed during archiving, is shown in Table 1. The first object encountered during the archiving process would be the menu 20. As the first-encountered instance of the menu class, the archiver obtains from the menu object a reference identifying the menu class for entry into the object document 28, as shown in line 1 of Table 1. Then, the archiver instructs the menu object to transmit its attributes (location, size, label, etc.) for entry in the object document 28.

One of the attributes of the menu 20 is button 20a, hence the menu object transmits to the archiver, a pointer to the button object 20a as one of its attributes. The archiver then queries the button object 20a in order to obtain class information from the button object 20a. Since button 20a is the first instance of the button class, the archiver places a reference to the button class into the object document 28, as shown in line 3 of Table 1. Then, the "putTo" message is passed from archiver to button object 20a. The button object 20a transmits its attributes (location, size, label, and message) as "Button #1" shown on line 4 of Table 1.

Since one of the attributes of the button 20a is a window object, the button object 20a transmits to the archiver a pointer to the window object. The archiver then queries the window object in order to obtain the class identity of the window object. The archiver recognizes the resulting window class reference as the first occurrence of the window class, and enters a window class reference into the archive, as shown at line 5 of Table 1. Then, the archiver sends a "putTo:" message to the window object to save the attributes of the window object.

When all of the objects depending from button object 20a have been archived, then button object 20b and its attributes are entered into the archive as "Button #2" in Table 1. Archiving of button 20b, in turn, initiates the archiving of the window object that receives the "openWindow" message from button object 20b. Subsequently, any objects related to the window object of button 20b are also archived. When button object 20b has been archived, then button object 20c is archived as "Button #3" in Table 1, along with window object 22 and any other objects which recursively depend from button 20c.

TABLE 1

Tabular Representation of Example Application

| 1 | <Menu Class Reference> |
|---|---|
| 2 | [Menu Object] (menu attributes) |
| 3 |    <Button Class Reference> |
| 4 |    [Button #1 object] (button #1 attributes) |
| 5 |      <Window Class Reference> |
| 6 |      [Window #1 object] (window #1 attributes) |
| 7 |      ... |
| 8 |    [Button #2 object] (button #2 attributes) |
| 9 |      [Window #2 object] (window #2 attributes) |
| 10 |      ... |
| 11 |    [Button #3 object] (button #3 attributes) |
| 12 |      [Window #3 object] (window #3 attributes) |
| 13 |      ... |

After button object 20c, and all of the objects related thereto have been archived, then all of the objects of the structure will have been saved, along with their attributes, into the object document 28. The recursive archiving procedure, which comprises a traversal of an object-oriented structure, allows the nested relationships of objects in the structure to be preserved in the arrangement of the object document 28. The object document 28 is preferably produced in a standard format, such as ASCII, so that it can readily be provided to other computer systems 30 and 32, which have different operating systems than computer system 10 and each other.

The development environment preferably includes an execution environment for object-oriented applications. For example, the development environment may allow the user to associate the object-oriented structure 35 with an application object 25, represented by an icon by which the user may execute the application. The application, comprising the application object 25 and the object oriented structure 35, can also be archived as described above, in which case the first reference entered into the object document would identify the application object 25.

In order to execute the developed application in computer system 30, a universal object library 11 is provided to the computer system 30. The objects defined within universal object library 11 are able to invoke native features of the operating system of the computer in which the library 11 is installed. In the preferred embodiment, the source code of the universal library 11 includes alternative forms of equivalent operating system calls within each of the source code modules that define classes which employ native features. For example, the source code for a window object includes more than one operating system-specific form of a system call for drawing a window. Each such specific form of a call is set off from the other, equivalent forms of the call within a conditional block identifying the target operating system. When the source code of the library is compiled to produce the executable version of the object library, the compiler is capable of selectively compiling only those conditional blocks which refer to the resident operating system, in addition to any unconditional or common source code, within each source module.

The universal object library 11 is preferably coded in a standard high-level language that includes a provision for selective compilation of conditional blocks of code, wherein the identity of the native operating system can be specified as the compilation-determining condition. Additionally, it is preferable to employ a high-level language for which compilers have been developed for at least as many operating systems upon which deployment of applications is desired. One such language meeting these criteria is "OBJECTIVE C". "OBJECTIVE C" compilers that are compatible with several operating systems, such as "MS-DOS", "WINDOWS", "UNIX", "OS/2", and the like are commercially available from Stepstone Inc. of Sandy Hook, Conn.

The inclusion of conditional, native object definitions within the universal object library 11 allows the appearance of the user interface of an application to assume the standard appearance of a user interface within each computer system upon which the application is deployed. Referring again to FIG. 1, the menu 20, which has the appearance of a native menu within the development environment, will be rendered differently as native menu 20' and as native menu 20" when the application is deployed to respective computer systems 30 and 32 having different operating systems. The functionality provided by the menus 20, 20', and 20" will, of course, remain the same within each of the computer systems 10, 30, and 32. In alternative embodiments, the object library 11 can be provided in a pre-compiled or executable form to each of the computer systems upon which deployment of the application is desired. In addition to providing the object library 11 to the computer systems 30 and 32, any application-specific objects that were defined during development of the application are also provided to the computer systems 30 and 32. Such application-specific objects can be linked with the library 11 within each of the computer systems 30 and 32. Alternatively, any application-specific objects can be used to create one or more additional custom libraries that are also provided to computer systems 30 and 32.

It may occur that certain objects, or classes of objects, are capable of expressing greater varieties of attributes in one operating system environment than in another environment. For example, the operating system of computer 10 may provide more varieties of standard buttons than the operating system of computer 32, which may only provide a single standard button. The type of button desired, which may be designated as an attribute of a button object when the application is developed, would have no corresponding significance in the context of the operating system of computer 32. One way to deal with variations of available attributes would be to limit the selection of attributes within the development environment to the selection allowed by the most limited target operating system. In the preferred embodiment, object attribute options that do not correspond to a native feature of an operating system are ignored, or discarded by the "getFrom:" procedures within the conditional blocks defining the native classes for that operating system. Hence, the portion of the object library 11 which defines the button class in the context of the operating system of computer 32 simply provides the native button feature of that operating system regardless of the button-type attribute of any button object that is referred to in the object document 28. The function provided by a button, i.e. sending a message to a specified recipient object when the button is actuated, will of course remain the same in both environments.

When the object library 11 has been provided to the computer system 30, the application that was developed in the development environment can be re-created for execution by the system 30 as follows. An execution program 34 and the object document 28 are provided to the computer system 30. The execution program 34 preferably comprises a main routine that initializes an application object and instructs a de-archiver to build the application in accordance with the object document. The main routine of the execution program 34 is compiled and linked with the library prior to execution, so that it may access any objects required by the application.

More than one library 11 may be provided such that different sets of related classes are defined within each library. Also, some operating systems may provide for additional classes to be dynamically linked to a pre-existing executable library. For example, standard objects such as dictionaries, stacks, a de-archiving object, and an application object may be contained within a standard object library. Another library may provide GUI objects such as windows, buttons, and the like. Still other libraries may contain database objects or objects that are specifically designed for a particular industrial application. When the execution program 34 is compiled, it may also be linked with any custom libraries or with source modules providing objects that are not defined in the standard library 11.

The source code for the execution program 34 is usually essentially the same for each developed application. Within the source code for the execution program, the reference to the name of the object document pertaining to the application is entered therein prior to compilation of the execution program in order to identify the archive corresponding to the desired application. Alternative procedures for identifying the desired object document to the execution program can be provided, such as by entering the name of the desired object document in response to a query made by the execution program at run time.

Figure 3:
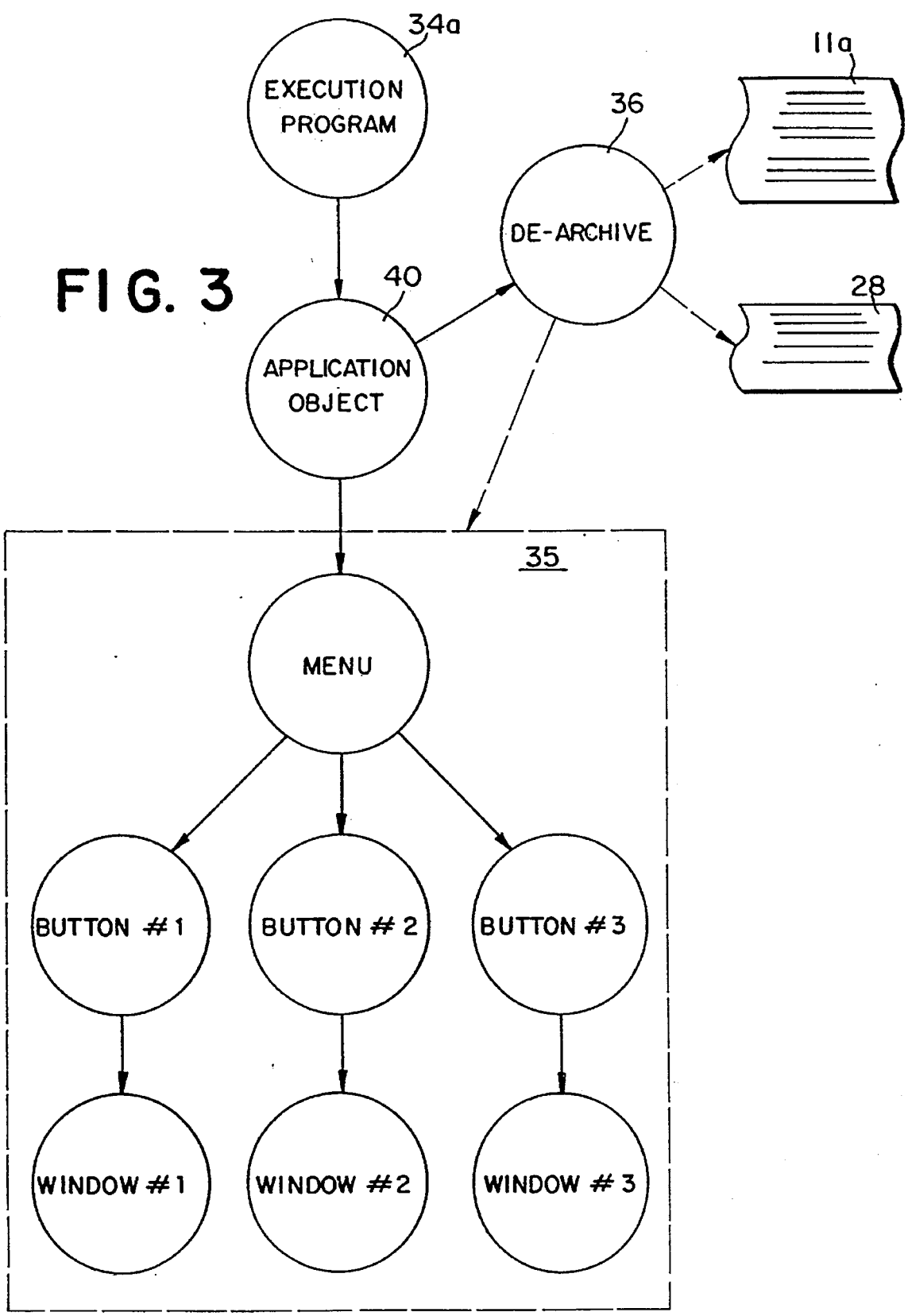
FIG. 3 is a diagram of a procedure for re-constructing and executing the application of FIG. 1 when it is deployed.

When the execution program has been compiled, it can then be executed. As shown in FIG. 3, the execution program may be represented as an icon 34a that is made available to the user for executing the corresponding application. Upon actuation of the icon 34a, an instance 40 of the application object is initialized. Then, the instance 40 sends a message to a de-archiving object 36 to build within the memory of the computer, on the basis of the object document 28 and the compiled library 11, the arrangement of objects 35 that was made during development. The de-archiving object 36 assigns ownership of the assembled objects 35 to the instance 40 of the application that was initialized by the actuation of the application icon 34a.

When the de-archiver 36 has completed the task of re-constructing the application, then the instance 40 of the application object passes a message to the first object of the structure 35, in this case a menu, to appear on the display. Then, the execution program begins the event loop.

The manner in which the execution program 34a initializes the application 40 and starts the event loop is established within the source code of the execution program in a manner that is dependent upon the operating system of the computer in which execution is to take place.

As described hereinabove, the portability of an object-oriented structure to a particular target environment would require that the library contain definitions of the objects therein that are compatible with the target environment. Thus, a large number of conditional object definitions would be required in order to provide a single, universal object library that would be widely and generally applicable for the development of various object-oriented structures. In order to obviate the need for a large standard library, the principles of the present invention can be extended to provide a standard archive format for use with system-dependent, or native, object libraries.

One way to accomplish cross-platform portability of a native object library is to establish, for each object in the library, a procedure by which each object can be archived in a canonical form. For example, some commercial developers of object libraries provide source code of their objects so that "getFrom:" and "putTo:" archiving procedures can be added directly to the source definitions of the objects. In development environments which do not permit such source modifications, then the archiving procedures can be added to subclasses or categories of the objects in the library, or to desired ones thereof. Development of a portable structure would then proceed by employing the objects which have been provided with the requisite "putTo:" and "getFrom:" procedures. The archiver responds to the attributes transmitted from the "putTo:" procedures by entering the transmitted attributes into an archive according to a predetermined canonical format for each type of object. In order to translate various native object references into the predetermined canonical format, the archiver can be conditionally coded so that it translates each native reference to a canonical reference within the environment in which the archiver is compiled.

For example, when the archiver obtains the class identity of button object 20a, the name of the button class that is obtained by the archiver may be a button class name that is unique to the environment in which the menu 20 is being archived. In order to produce a portable object document, the archiver is conditionally coded to translate the native button class name into a canonical, environment-independent name, when the archiver is executed within that environment. Similarly, other native attribute references can be translated into a canonical format by the archiver for entry into the object document. Of course, the archiver may be more specifically arranged to translate native object references in one environment into native object reference pertaining to another specific environment in an alternative embodiment for providing one-way portability between only two environments.

It is also desirable to provide the ability to perform the converse translation of each canonical archive reference into the native names and attributes of the native objects when an object document is de-archived. Such translation can be accomplished by the de-archiving object described generally hereinabove in connection with FIG. 3. For example, for each canonical object definition, the portion of the de-archiver source code that is responsible for de-archiving that type of object, can include several conditional blocks which define, for each target environment, the manner in which the canonical archive reference is to be translated into a native object. Then, when the de-archiving object is compiled on a target platform, the canonical archive references will thenceforth be translated into the objects and attributes that are native to that target platform.

For example, in the NEXTSTEP development environment, the message for opening a window is "-makeKeyAndOrderFront:sender", while in the WINDOWS environment, the equivalent message is "-openWindow". Thus, the source code of the de-archiving object would contain an "#ifNext" block containing instructions for translating a canonical "OPENAWINDOW" message as "-makeKeyAndOrderFront:sender" when the de-archiving object is compiled and executed in the NEXTSTEP environment. The source code of the de-archiving object would also contain an "#ifWindows" block containing instructions for translating a canonical "OPENAWINDOW" message as "-openWindow" when the de-archiving object is compiled and executed in a WINDOWS environment.

Using the de-archiving object to translate canonical forms into native forms in the manner described above would require periodic modification of the de-archiver in order to cope with new objects or new object libraries as they become available. In order to avoid such modification of the de-archiving object, translation tables can be provided for each target environment as a separate module from the de-archiving object itself. For example, a translation table for use with the de-archiving object in a particular target environment may be provided as an ASCII text file that is structured to associate canonical names with the corresponding native names within the target environment. Similarly, other translation tables can be provided to contain entries that associate canonical attribute syntax, message syntax, and the like, with their corresponding native counterparts. It is envisioned that, for a given object-oriented environment, the requisite object archiving procedures, and the translation tables, would be included in a single kit for providing cross-platform portability within the context of that environment.

Another advantage that is conferred by the provision of translation tables is that the translation tables can also be used in the archiving process in order to eliminate the requirement for the archiver to be conditionally coded for each environment. During archiving, the archiving object would consult a translation table in order to convert native references into canonical references for storage in the object document. Such a capability would simplify the task of extending a native object library for use in a cross-platform deployment and development system, since translation into the canonical format would then be transparent to the user. Additionally, as new objects and object libraries become available, updated translation tables, or entries thereof, can easily be added to the target environments without modification of the archiving object. It is envisioned that commercial providers of newly-developed objects or object libraries would provide the requisite translation table modifications along with their products in order to provide their customers with cross-platform development and deployment capability.

Figure 4:
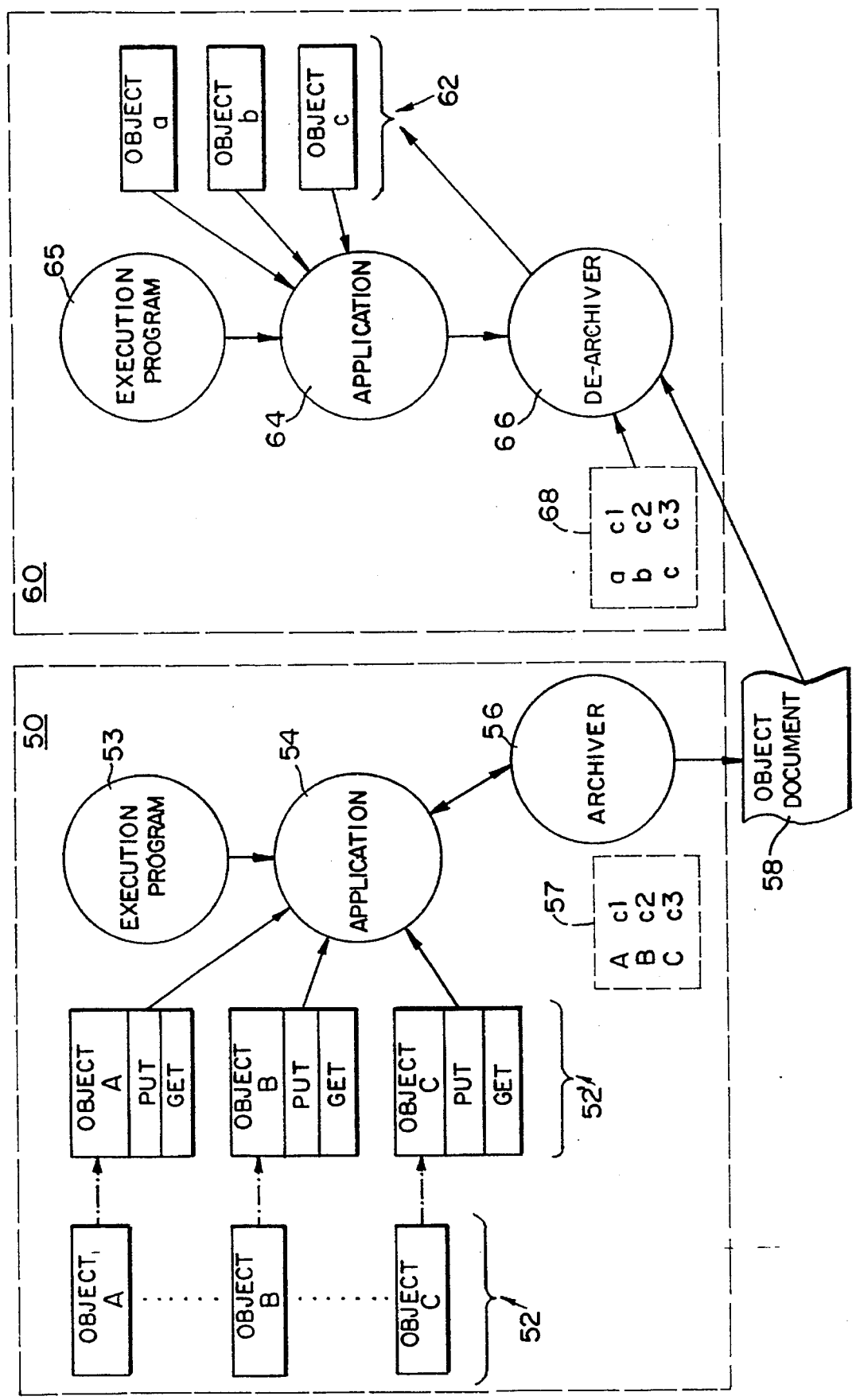
FIG. 4 is a diagram of an alternative embodiment of a cross-platform object-oriented development and deployment system.

For example, there is shown in FIG. 4 an object-oriented computing environment 50 that is installed within the memory of a computing system (not shown). Within the environment 50, there is provided a library of objects 52. The library 52 may be a commercially-available library which includes native objects A, B, and C. If the objects of library 52 do not include archiving procedures, then they are first enhanced by adding "PUT" and "GET" procedures to their source-code definitions or to subclasses or categories of the objects A, B, and C. Enhancement of the objects A, B, and C, results in the provision of an enhanced library 52' that can then be used to produce and/or deploy portable object-orient structures, for example application 54. Also included within the environment 50 is an execution program 53 for instantiating and invoking the application 54 for execution.

In order to produce an object document 58 for porting the application 54, the user invokes an archiver 56. The archiver sends a message to the application 54 to recursively activate the "PUT" procedure of each object within the application 54. Each object of the application 54 transmits a reference identifying its class and transmits references identifying its attributes to the archiver in response to receiving messages from the archiver to do so. The archiver 56 receives the references from the objects and places the references into the object document 58, subject to any necessary translation of any native references into a pre-defined canonical format. Translation of the native references that are obtained from the objects by the archiver, is accomplished by providing the archiver 56 with environment-specific translation instructions or by providing the archiver 56 with access to an environment-specific translation table 57. The translation table 57 contains a tabular list for associating each of native objects A, B, and C, and their corresponding canonical forms c1, c2, and c3.

When the archiving process is ended, the resulting object document 58 is provided in a portable form that can be supplied from the environment 50 to another object-oriented environment 60. Within the environment 60, there is provided an enhanced library of objects 62, which includes enhanced native objects a, b, and c. The objects a, b, and c within computing system 60 shall be mapped as the native equivalents of respective objects A, B, and C of computing system 50. Also provided within computing system 60 is an application object 64 and an execution program 65 for instantiating the application object 64. The application object 64 is structured, as has been described hereinabove, to instruct a de-archiver 66 to read an object document and instantiate objects as specified in the object document.

If the environment 60 includes a development environment, then the application can be further modified or developed within the environment 60. Most commercially-available development environments are user-extendable, in that an application programmer interface (API) or a customizable palette or toolkit is provided for allowing the user to define custom tools or objects for use in the development environment. Providing the application to a development environment is facilitated by extending the development environment to include the de-archiver. Once the de-archiver has been introduced to the development environment, then object-oriented structures defined by an object document can be deployed within the development environment.

The de-archiver 66 is provided with the object document in order to de-archive the application. The de-archiver advances a text pointer sequentially through the object document and passes messages to the objects identified therein to instantiate themselves. When the de-archiver 66 encounters a canonical object reference in the object document 58, the de-archiver translates the canonical reference into a native reference according to a previously-established relationship between canonical and native references. Then, the de-archiver sends a message to the corresponding native object in order to activate the "GET" procedure of the native object to retrieve its attributes. As the native object retrieves its attributes, the text pointer of the de-archiver is advanced through the attribute fields within the object document until the object's attributes have been retrieved.

The de-archiver 66 may be conditionally coded to perform translation of canonical references into native references within the context of the environment 60. Alternatively, the de-archiver 66 has access to a translation table 68 which contains a table for associating canonical references into references that are native to the environment 60. As shown in FIG. 4, the translation table 68 contains entries that associate the native objects a, b, and c, with respective canonical references c1, c2, and c3.

As the de-archiver 66 instantiates the objects that are identified within the object document, ownership of the instantiated objects is provided to the application object 64. When the de-archiver completes de-archiving, the execution program 65 launches execution of the ported application by starting the event loop.

As has been described hereinabove, it may occur that a native object in one computing system may have more or fewer attributes than a corresponding native object in another computing system. In embodiments wherein the de-archiver translates the object document, or wherein a translation table is used, the translation is preferably performed such that each native object is provided with only those attributes from the object document that are required by the native object. For example, the canonical definition of a button object may include attributes of size, location, and shape. If a button object is archived within a computing system in which the native buttons also include attributes of size, location, and shape, then the specified attributes will be entered into the object document in association with the archived button. Then, when the structure including the button is deployed within a computing system in which the native buttons do not include, for example, a shape attribute, then the de-archiver will not provide the shape attribute to any buttons that are de-archived within the deployment platform. The function of omitting unused attributes can be provided in several ways, such as by conditionally coding the de-archiving object to omit any unused attributes in each environment, by providing a translation table which translates any unused attributes into null attributes within each environment, or, preferably by arranging the "getFrom:" procedure of the native objects in each environment to ignore or discard any unused attributes specified in the object document. In still other embodiments, the de-archiver may read the entire object document and store the information therein within the memory of the host computer system. Then, the de-archiver invokes the specified objects and provides them with their requested attributes directly, rather than to pass the attributes from the object document to the objects in conjunction with sequentially reading the object document.

In the converse situation, where an object with fewer native attributes than the canonical form is archived, the "putTo:" procedure of the object can be arranged to provide predetermined default values for the unused attributes. Alternatively, the default values may be entered into the object document by the archiver, which would be conditionally coded for each environment to enter the default values into the object document. In other alternative embodiments the archiver can access a translation table in order to obtain the default values for entry into the object document.

The canonical object definitions should be based upon native objects of each type that have the greatest number of attributes, so that the canonical definitions will be comprehensive enough to permit archiving of all native objects of each type, regardless of the number of attributes that are required for each type of object in any particular environment. Of course, it is to be expected that objects of a given type that are developed after the establishment of the canonical definition for that type, may have a greater number of attributes than is permitted by the canonical definition.

One approach to archiving a native object which has more attributes than its canonical definition is to provide the object with the ability to enter "custom" information into the object document in such a way that the custom information will subsequently be recognized as such. For example, within the "putTo:" procedure, a "putCustom:" step can be added wherein the object returns the custom information within a pair of predefined delimiters that have been selected to identify the information therebetween as custom information. The de-archiving object is programmed to recognize the custom information delimiters and to provide the custom information only to objects which request the custom information by corresponding "getCustom:" procedures in their respective "getFrom:" procedures.

For example, in one computing system, a native button object may have, as an attribute, a bitmap of an image to be positioned upon the button. If the canonical definition of the button object does not permit entry of the bitmap into the standard attribute fields of the object document, then the native button object is provided with a "putCustom:<bitmap>" step within its "putTo:" procedure. The putCustom step will return the bitmap, bounded by the custom information delimiters, into the object document. Additionally, the button object is provided with a corresponding "getCustom:<bitmap>" step for retrieving the custom information when it is subsequently de-archived in the same environment. If the button object is de-archived in an environment wherein the native buttons do not employ such bitmaps, then the de-archiver provides the required canonical attributes, but the delimited bitmap is recognized as custom information that is not required by the native buttons. Upon encountering the custom information delimiters when the object document is read, the de-archiver may store the custom information in a temporary buffer in case an object later requests the custom information, then the de-archiver advances its text pointer to the end of the custom information field. In alternative embodiments, the de-archiver may buffer all of the information within the object document prior to providing requested attributes to objects when they are de-archived.

In addition to providing individual objects with the ability to cause entry of custom information within an object document, the archiver may be provided with the ability to enter environment-specific information into the archive. Similarly, the de-archiver may be programmed to detect environment-specific information within the object document and to de-archive the environment-specific information only when the de-archiver is deployed within the indicated environment.

After the establishment of the canonical definition for a type of object, it may also occur that several different native objects of that type are subsequently made available for use in different environments, such that each of the native objects has been provided with a new attribute that is equivalent in each respective environment. Rather than to use "putCustom:" or "getCustom:" steps to handle the new attribute, it may be preferable to provide a new canonical definition for that type of object to include the new attribute. In order to maintain portability and compatibility with systems using the previous set of canonical attributes, a version number can be assigned to each successive generation of a canonical definition. Then, whenever an object, or the first instance of the class of that object within an application is archived, the version number of the object's canonical definition is also entered into the object document along with the reference to the class. Additionally, the object document may itself be assigned a version number corresponding to the version of the canonical definitions that were entered into the object document. The version number of the object document would be entered into the object document by the archiver. During subsequent de-archiving of the application, the canonical definition corresponding to the archived version of the class or of the object document shall be used by the de-archiver to map the attributes of each archived class into the native objects.

For example, if an object document contains an instance of the fourth version of the button class, and the application is being de-archived on a platform which only supports the third version of the button class, then the attributes provided to the native buttons will be only those attributes of the fourth version which are common to both the fourth version and the third version of the button class. Additionally, when an application is being ported to a fourth version platform from a third version platform, then standard default attribute values will be provided by the de-archiver to the native buttons on the fourth version platform for each attribute that is not included in the third-version canonical definition for button class.

In the proliferation of object-oriented programming techniques, it is expected that there will be some environments which provide a greater variety of objects than other environments. Thus, it may occur in some situations that there exist more established canonical types of objects than are supported within a particular computing system. In order to provide portability of object-oriented structures to such a relatively limited environment, it is desirable to provide a null object therein to substitute for any unsupported objects that may be referred to in an object document. The null object is preferably an object which receives messages from other objects and does nothing. The provision of a null object at least allows an application containing unsupported objects to de-archive in a limited environment, although the fully-intended functionality of the application will not be provided in that environment. In some situations, providing at least the remaining partial functionality of the application would be acceptable. For example, a structure such as an application may use a peculiar object for performing a function that is only rarely used, or otherwise not of primary importance. A translation table entry of the relatively limited computing system may instruct the de-archiver to translate the peculiar object into a null object. Alternatively, the de-archiver may be directly programmed to map any non-available classes to the null object. By providing the null object in place of the peculiar object, de-archiving will proceed without error. The application may also execute without encountering an error, unless the application reaches a point during execution at which the peculiar object is relied upon to perform a critical function. If the user desires to have the application perform that function, then the user may decide to purchase or develop a native version of the peculiar object, and to obtain or make the necessary modification to the translation table. In this manner, the user can use or test a new application without having to purchase all of the objects that may be employed by the new application.

More than one archive may be associated with an object-oriented application. Objects within an application, for example, may have attributes which include other previously-developed, object-oriented structures having their own object documents. In the example described above in connection with FIG. 1, each of the three buttons may comprise a graphical interface to one or more previously-developed structures, for example a document form. Thus, in developing the buttons of the example application, the user would define relationships between each of the buttons and the archived object structure(s) with which the buttons are to be associated. Of course, more than one of the buttons may be associated with the same object document in order to produce distinct instances of the archived structure when a button is actuated. Similarly, a distinct instance of the archived structure can be created each time a single button is actuated. When one of the buttons is actuated, the selected button shall then send a message to de-archive its archived attribute. A delegate object may be provided for receiving the message from the button and for de-archiving the archived structure. The delegate object would then control whether a new instance of an archived structure is created or whether a single instance of an archived object is to be shared. Additionally, the delegate object can select the appropriate object document for de-archiving, or prompt the user to identify the desired object document. Hence, the complete application would include its own object document and any supporting object documents that are used within the application.

As has been described above, native objects in object-oriented environments are enhanced to include a "putTo:" procedure for entering their attributes into an archive, and "getFrom:" procedures for retrieving their attributes from an archive. The "putTo:" procedure of each object is activated by the archive object whenever the archive object detects a reference to the object as an attribute of another object. The "getFrom:" procedure of each object is activated by the de-archiver whenever the de-archiver detects a reference to the object in the object document.

In an alternative embodiment, the objects may each be provided with a "set" procedure for setting a specified individual attribute in response to a "set" message from another object, and a "get" procedure for transmitting a specified individual attribute in response to a "get" message from another object. Most commercially-available object libraries include such procedures. In such an embodiment, the archiver may actively retrieve the attributes of each object when each object is archived, rather than to passively receive each object's attributes in response to a "putTo:" procedure. Similarly, the de-archiver could actively provide each attribute to an object when it is de-archived, rather than instructing the object to retrieve its attributes using a "getFrom:" procedure. As can be appreciated, the archiver and the de-archiver would each have class-specific routines for respectively archiving and de-archiving each type of object.

For example, the archiver would be specifically programmed to request the size, location, title, and content attributes of a menu in order to archive a menu. The de-archiver would be specifically programmed to set the size, location, title, and content attributes to a menu in order to de-archive a menu. The active employment of the archiver and the de-archiver to respectively obtain and transmit object attributes would eliminate the need to provide "getFrom:" and "putTo:" procedures that conform to a predetermined canonical arrangement of attributes. Hence, it would not be necessary to enhance the native objects of a commercially-available library with the "putTo:" and "getFrom:" procedures as described hereinabove in connection with FIG. 4.

Alternatively, rather than to program the archiver and the de-archiver with instructions for archiving and de-archiving each specific class, the archiver and the de-archiver can be provided with access to association objects that would provide to the archiver and to the de-archiver, the requisite information needed to archive or de-archive instances of each class. The collection of association objects would be defined by a master object document. The master object document would preferably provide definitions of association objects for allowing the archiver and de-archiver respectively to set and to get the attributes of each native object in the environment, and to appropriately translate canonical and native references. Then, deployment within new environments, or deployment within a newly-modified environment, would only require appropriate modification of the master object document defining the association objects for an intended target environment.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed.

That which is claimed is:

1. A method of providing an object-oriented structure to a selected computer system having a first operating system, comprising:

providing a library of classes to the selected compouter system;

developing the object-oriented structure, having a plurality of inter-relations among a plurality of selected objects, on a second computer system having a second operating system different from said first operating system;

archiving the inter-relations among the selected objects in the object-oriented structure to provide a portable object document;

providing said portable object document to the selected computer system; and constructing, within the selected computer system, said object-oriented structure, by instantiating the selected objects from among the classes in said library, and forming inter-relations among the instantiated objects in accordance with said portable object document.

2. The method of claim 1 where said step of providing a library of classes comprises the step of defining source code for said classes in a standard language adapted to be compiled on computer systems having differing operating systems.

3. The method of claim 2 wherein said defining step comprises including instructions in said source code to effect selective compilation of a portion of said source code for activating a native feature of one of said differing operating systems when said source code is compiled and executed in said one operating system.

4. The method of claim 1 wherein said developing step comprises a step of specifying a first set of attributes for one of said plurality of selected objects; said archiving step comprises a step of storing the specified first set of attributes within the portable document; and said instantiating step comprises the step of providing the selected object with a second set of attributes within the selected computer system as a subset of said first set of attributes.

5. The method of claim 1 wherein said developing step comprises a step of specifying a first set of attributes for one of said plurality of selected objects; said archiving step comprises a step of storing the specified first set of attributes within the portable document; and said instantiating step comprises the step of providing the selected object with default attributes within the selected computer system in excess of the first set of attributes.

6. The method of claim 1, comprising the step of configuring each of said plurality of selected objects to produce a reference to itself in response to an archiving message; and wherein said archiving step comprises the steps of passing an archiving message to each of the selected objects thereby to responsively generate a stream of references, and storing the references in the portable object document.

7. The method of claim 6 wherein said configuring step comprises the step of configuring each of said objects to produce said reference in a system-independent format, and said storing step comprises writing said references directly into the portable object document.

8. The method of claim 6 wherein said configuring step comprises the step of configuring each of said objects to produce said reference in a system-dependent format, and wherein said archiving step comprises the step of translating said references into a system-independent format prior to said storing step.

9. The method of claim 8 wherein said translating step comprises the step of consulting a translation table to identify a system-independent reference for each received system-dependent reference.

10. The method of claim 1 comprising the steps of modifying said object oriented structure within said selected computer system, performing another archiving step within the selected computer system thereby to produce a second portable object document, providing said second portable object document to a third computer system, and performing another constructing step within the third computer system thereby to construct the object oriented structure within the third computer system as modified within the selected computer system.

11. The method of claim 10 wherein said third computer system has an operating system identical to the second operating system.

12. The method of claim 10 wherein said third computer system has an operating system different from the first and second operating systems.

13. The method of claim 1 wherein said providing step comprises defining a class of null objects in the library; said developing step comprises the step of including within said object oriented structure a selected object which does not correspond to a class within the library; and wherein said constructing step comprises the step of instantiating a null object within the selected computing system in the place of said selected object within the object oriented structure.

14. The method of claim 1 wherein said developing step comprises assigning a system-specific attribute to an object within the second computing system;

said archiving step comprises the step of storing information pertaining to the system-specific attribute within the portable object document along with an identification of the operating system to which the system-specific attribute pertains; and said constructing step comprises:

detecting the presence of the system-specific attribute within the portable object document;

identifying the operating system to which the system-specific attribute pertains; and disregarding the system-specific information if the identified operating system is not the first operating system.

15. The method of claim 1, comprising the steps of:

defining a class in the library to have a canonical set of attributes; and wherein said developing step comprises providing an object with a custom attribute in excess of its defined canonical set; and said archiving step comprises the step of storing information pertaining to the custom attribute within the portable document along with an indication that said attribute is in excess of the corresponding canonical set of attributes.

16. The method of claim 15 comprising the step of configuring a class within the library to retrieve the custom attribute from the portable object document during said instantiating step.

17. The method of claim 1 wherein said providing step comprises providing a native class library to the selected computer system, the method further comprising the step of modifying the native class library to provide classes therein with routines for retrieving attributes from the portable object document and for storing attributes within a portable object document.

18. The method of claim 1 wherein said archiving step comprises the steps of:

providing a master document within the second computer system, the master document containing instructions for obtaining attributes of objects in the object oriented structure;

identifying objects in the object-oriented structure;

obtaining the attributes of the identified objects on the basis of the instructions contained in the master document; and storing the obtained attributes in the portable object document.

19. The method of claim 18 wherein said constructing step comprises the steps of:

providing a second master document to the selected computing system containing instructions for obtaining attributes from the portable object document and assigning the obtained attributes to native objects of the selected computing system; and assigning attributes to objects within the second computing system on the basis of attributes specified in the portable object document during said instantiating step.

20. A system for cross-platform deployment of an object-oriented structure developed in an object-oriented development environment having a first operating system, comprising:

a library for providing a palette of objects for constructing the object-oriented structure, wherein at least one object therein is defined to invoke a native feature of said first operating system and to invoke a native feature of a second operating system on a conditional basis when said library is compiled within one of said first operating system and said second operating system;

the development environment having selecting means for selecting objects from the palette to develop the object oriented structure; and an archiver for producing a platform-independent portable archive of the object-oriented structure within the development environment.

21. The system of claim 20 wherein said archiver comprises:

response means encoded within each object in the library for responding to an archiving message by transmitting a reference message;

request means for transmitting an archiving message to the objects within the object oriented structure; and recording means responsive to said response means for recording said reference message in the portable archive.

22. The system of claim 21 wherein said response means is configured to include in said reference message an identification of each object in the object oriented structure and a list of attributes associated with each object in the object oriented structure.

23. The system of claim 22 wherein said response means is configured to produce said reference message in a system-independent format.

24. The system of claim 22 wherein said response means is configured to produce said reference message in a native format and wherein said recording means comprises translating means for translating said reference message into a system-independent format for recording in the portable archive.

25. A method of providing cross-platform portability to an object oriented structure, between a first environment having a library of first native object classes and a second environment having a set of second native object classes, the method comprising:

providing each of said first native object classes with a procedure for transmitting a reference to its attribute in response to receiving a message to archive itself;

sending a message to each of the objects within the object oriented structure to archive itself, whereby respective attribute references are transmitted by each object;

translating at least one of said transmitted references into a system-independent reference in accordance with a predefined correspondence between said one reference and said system-independent reference;

storing said transmitted references and said system-independent reference into a portable archive within said first computer system;

providing each of said second native object classes with a procedure for retrieving attributes from an archive, thereby to instantiate an object of said each class;

providing the portable archive to the second computer system; and deploying the structure within the second computing system by translating said system-independent reference in the portable archive as a reference to one of said second native object classes, and by invoking said procedure for retrieving attributes thereby to instantiate an object of one of said second native object classes.

26. The method of claim 25 said step of translating said transmitted reference into a canonical reference includes the step of providing an archiver in the first computing system that is conditionally coded to translate said transmitted reference into said canonical reference.

27. The method of claim 25 comprising the step of providing a translation table within said first computing system for associating native object references with canonical object references, and wherein said step of translating said transmitted reference into a canonical reference includes the step of consulting the translation table.

28. A system for porting an object-oriented structure to an object-oriented computing environment having a library of native object classes with selectable attributes, the system comprising:

an object document containing a structured list of objects constituting the object-oriented structure, said list including entries identifying said objects in a system-independent format and including specified attributes of said objects;

a de-archiver for reading the object document, for translating the entries therein from the system-independent format into a native format, and for instantiating the objects identified therein from among the classes in the library by instructing the corresponding native objects to retrieve the specified attributes from the object document.

29. The system of claim 28, comprising a translation table accessible to said de-archiver, said translation table including entries therein for associating canonical object references with native object references and for providing said entries to said de-archiver.

30. A method for providing portability for an object oriented structure, comprising a plurality of objects having specified attributes, among a plurality of object oriented computing systems having mutually incompatible operating systems and each having a plurality of native objects, comprising the steps of:

establishing a canonical definition of each of a plurality of object classes, said definition including a canonical set of attributes for each defined class;

providing each environment with de-archiving means for associating said canonical definitions with corresponding ones of said native objects;

producing a structured list of the objects and their attributes constituting the object oriented structure in accordance with the respective canonical definitions of the objects and their attributes;

storing said list of objects and their attributes in a portable document; and distributing said portable document among said object oriented computing systems.

31. The method of claim 30, further comprising:

instantiating said object oriented structure within each of said computing systems by invoking said de-archiving means to identify corresponding native objects to the objects within the structured list, and providing said corresponding native objects with attributes specified in the list.

32. The method of claim 31 comprising the steps of:

providing at least selected ones of said computing systems with object oriented development means for modifying said object oriented structure;

modifying said object oriented structure within any one of said selected computing systems;

providing said any one of said selected computing systems with archiving means, including means for associating said native objects with corresponding canonically-defined objects, for producing a second portable document;

producing the second portable document within said any one of said selected computing systems; and distributing said second portable document from said any one of said selected computing systems to the other computing systems.

33. The method of claim 31 wherein said establishing step comprises:

assigning a first version identifier for each established canonical definition for identifying a version of each established canonical definition;

the method further comprising:

establishing a superseding definition for an established class, including a superseding set of attributes having said canonical set of attributes as a subset thereof; and wherein said storing step comprises the step of storing the corresponding version identifier for objects listed in the portable document; and said instantiating step comprises providing said corresponding native objects with one of said superseding set of attributes and said canonical set of attributes in accordance with a comparison of the stored version identifier and the identity of each of said native objects.

34. A method of deploying an object-oriented structure from a first computing system having a first operating system, to a second computing system having a second operating system, comprising the steps of:

assigning attributes to objects in the object-oriented structure within an object-oriented development environment of the first computer system;

providing a master document within the first computer system, the master document containing instructions for obtaining attributes of objects in the object oriented structure;

archiving the object-oriented structure by identifying objects in the object-oriented structure, employing the master document to obtain the attributes of the identified objects, and storing the obtained attributes in a portable object document;

providing the portable object document to the second computing system; and de-archiving the object-oriented structure in the second computing system by assigning attributes to objects within the second computing system on the basis of attributes specified in the portable object document.

35. The method of claim 34 wherein said de-archiving step comprises:

providing a second master document within the second computing system containing instructions for obtaining attributes from the portable object document and assigning the obtained attributes to native objects in the second computing system.

* * * * *